United States Patent
Utecht

(10) Patent No.: US 9,771,704 B1
(45) Date of Patent: Sep. 26, 2017

(54) INSULATED EXCAVATION TUBE

(71) Applicant: Peter W. Utecht, Hartford, WI (US)

(72) Inventor: Peter W. Utecht, Hartford, WI (US)

(*) Notice: Subject to any disclaimer, the term of this patent is extended or adjusted under 35 U.S.C. 154(b) by 0 days.

(21) Appl. No.: 15/292,220

(22) Filed: Oct. 13, 2016

(51) Int. Cl.
*F16L 3/00* (2006.01)
*E02F 3/88* (2006.01)
*E02F 3/92* (2006.01)

(52) U.S. Cl.
CPC .......... *E02F 3/8891* (2013.01); *E02F 3/9243* (2013.01); *F16L 3/00* (2013.01)

(58) Field of Classification Search
CPC ...... E21B 7/20; E21B 7/18; E02F 5/00; E02F 5/02; E02F 3/90; E02F 3/92; A47L 11/4075; A47L 9/24; A47L 9/242; A47L 9/244; A47L 9/248
USPC ........... 138/177, 109, 155; 37/317–323, 347, 37/348; 15/414, 312.2, 314, 315, 410
See application file for complete search history.

(56) References Cited

U.S. PATENT DOCUMENTS

| | | | | |
|---|---|---|---|---|
| 2,121,858 A * | 6/1938 | Chew | .................... | E21B 11/005 175/213 |
| 4,011,652 A * | 3/1977 | Black | .................... | B23P 11/00 285/53 |
| 4,589,932 A * | 5/1986 | Park | .................... | C22F 1/05 148/417 |
| 4,776,731 A * | 10/1988 | Briggs | .................... | B65G 53/28 15/409 |
| 4,936,031 A * | 6/1990 | Briggs | .................... | E02F 3/925 37/189 |
| 5,170,943 A * | 12/1992 | Artzberger | .................... | E02F 3/9206 137/625.27 |
| 5,212,891 A * | 5/1993 | Schuermann | .................... | E02F 3/9206 241/1 |
| 5,295,317 A * | 3/1994 | Perrott | .................... | E02F 3/925 175/66 |
| 5,860,232 A * | 1/1999 | Nathenson | .................... | E02F 3/92 15/300.1 |
| 5,887,667 A * | 3/1999 | Van Zante | .................... | E02F 5/003 175/218 |
| 5,966,847 A * | 10/1999 | Nathenson | .................... | B08B 5/02 137/874 |
| 6,158,152 A * | 12/2000 | Nathenson | .................... | E02F 3/9206 239/532 |
| 6,446,365 B1 * | 9/2002 | Sullivan | .................... | E02F 3/925 37/195 |

(Continued)

*Primary Examiner* — Patrick F Brinson
(74) *Attorney, Agent, or Firm* — Donald J. Ersler

(57) ABSTRACT

An insulated excavation tube preferably includes a non-conductive tip tube, a non-conductive connector tube, a first vacuum tube, a second vacuum tube, a flange member and a handle. One end of the first vacuum tube is retained in one end of the non-conductive tip tube. A distance is maintained between an end of the first vacuum tube and an opposing end of the non-conductive tip tube to provide electrical and vibration isolation. An opposing end of the first vacuum tube is retained in one end of the non-conductive connector tube. One end of the second vacuum tube is retained in the non-conductive connector tube. A gap is maintained between the opposing end of the first vacuum tube and the one end of the second vacuum tube. The flange member is attached to an opposing end of the second vacuum tube. The handle is attached to the second vacuum tube.

17 Claims, 2 Drawing Sheets

(56) References Cited

U.S. PATENT DOCUMENTS

| | | | |
|---|---|---|---|
| 6,618,966 B2 * | 9/2003 | Russo .................. | E02F 3/9206 175/212 |
| 6,751,893 B2 * | 6/2004 | Sullivan ................ | E02F 3/925 37/195 |
| 6,895,670 B1 | 5/2005 | Dresang et al. | |
| 7,743,537 B2 * | 6/2010 | Maybury, Jr. ........ | E02F 3/8816 37/323 |
| 7,921,560 B1 | 4/2011 | Dresang et al. | |
| 8,719,997 B1 * | 5/2014 | Nathenson .............. | B08B 5/04 15/300.1 |

* cited by examiner

INSULATED EXCAVATION TUBE

BACKGROUND OF THE INVENTION

1. Field of the Invention

The present invention relates generally to excavation and more specifically to an insulated excavation tube, which reduces the possibility of being electrocuted when working in the area of an underground electrical power line.

2. Discussion of the Prior Art

Hydraulic and pneumatic excavation are used to expose gas lines, electrical power lines, water pipes and other sensitive items located in the ground. However, if insulation surrounding an electrical power has been partially eroded, an operator could be electrocuted when electricity transfers from the exposed line to a tip of an excavation tube.

Accordingly, there is a clearly felt need in the art for an insulated excavation tube, which reduces the possibility of electrocution when working in the area of an underground electrical power line by insulating a vacuum end of the excavation tube; and also adds improved ergonomics by reducing vibration transmitted to an operation during use thereof.

SUMMARY OF THE INVENTION

The present invention provides an insulated excavation tube, which also provides vibration isolation during the use thereof. The insulated excavation tube preferably includes a non-conductive tip tube, a non-conductive connector tube, a first vacuum tube, a second vacuum tube, a flange member and a handle. One end of the first vacuum tube is inserted into one end of the non-conductive tip tube and secured thereto preferably with fasteners. An opposing end of the first vacuum tube is inserted into and attached to one end of the non-conductive connector tube. One end of the second vacuum tube is inserted into and attached to an opposing end of the non-conductive connector tube with fasteners. A gap is maintained between the opposing end of the first vacuum tube and the one end of the second vacuum tube. The flange member is attached to an opposing end of the second vacuum tube. The handle is preferably removably attached along a length of the second vacuum tube.

The handle preferably includes a first frame member, a second frame member, a locking latch, a first handle loop and a second handle loop. The first frame member includes a first resilient gasket attached to an inside perimeter thereof. The second frame member includes a second resilient gasket attached to an inside perimeter thereof. The first and second frame members include a semi-circular shape to receive an outer perimeter of the second vacuum tube. One end of the first frame member is pivotally secured to one end of the second frame member. The locking latch is used to secure the opposing ends of the first and second frame members to each other and to the outer perimeter of the second vacuum tube. The first and second resilient and non-conductive gaskets provide electrical isolation and vibration isolation from the second vacuum tube. The first handle loop is attached to the first frame member and the second handle loop is attached to the second frame member. The first and second handle loops may be coated with a non-conductive material for extra electrical isolation. However, the first and second handle loops could also be directly attached to the second vacuum tube.

Accordingly, it is an object of the present invention to provide an insulated excavation tube, which reduces the possibility of electrocution by insulating a vacuum end of the excavation tube.

Finally, it is another object of the invention to provide an insulated excavation tube, which also provides the unexpected result of vibration isolation during the use thereof.

These and additional objects, advantages, features and benefits of the present invention will become apparent from the following specification.

DETAILED DESCRIPTION OF THE PREFERRED EMBODIMENTS

Figure 1:
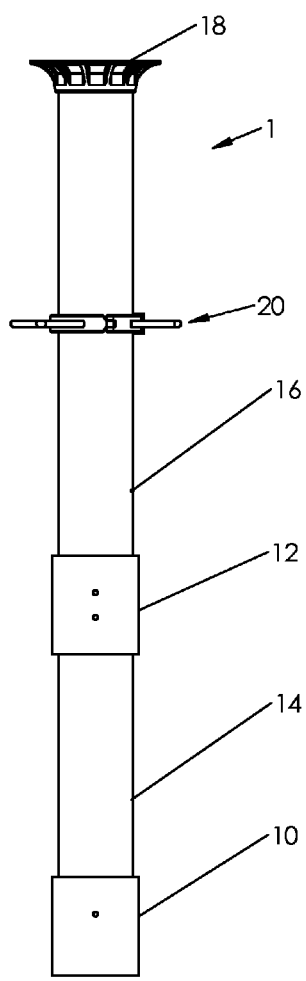
FIG. 1 is a front view of an insulated excavation tube in accordance with the present invention.
Figure 2:
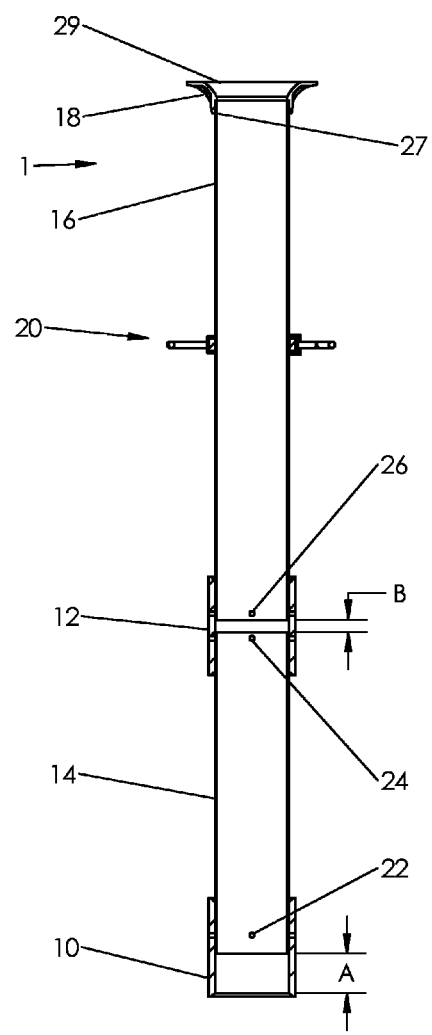
FIG. 2 is a cross sectional view of an insulated excavation tube in accordance with the present invention.

With reference now to the drawings, and particularly to FIG. 1, there is shown a perspective view of an insulated excavation tube 1. With reference to FIG. 2, the insulated excavation tube 1 preferably includes a non-conductive tip tube 10, a non-conductive connector tube 12, a first vacuum tube 14, a second vacuum tube 16, a flange member 18 and a handle 20. One end of the first vacuum tube 14 is inserted into an inner perimeter of one end of the non-conductive tip tube 10 and preferably secured thereto with fasteners 22. A distance "A" is maintained between an end of the first vacuum tube 14 and an end of the non-conductive tip tube 10 to provide electrical isolation and vibration isolation. It is preferable that the distance "A" have a dimension of about 4 inches, but other dimensions may also be used. An opposing end of the first vacuum tube 14 is inserted into an inner perimeter of one end of the non-conductive connector tube 12 and preferably secured thereto with fasteners 24. One end of the second vacuum tube 16 is inserted into an opposing end of the non-conductive connector tube 12 and preferably secured thereto with fasteners 26. A gap "B" is maintained between an opposing end of the first vacuum tube 14 and one end of the second vacuum tube 26 to provide electrical isolation and vibration isolation. It is preferable that the gap "B" have a dimension of at least 0.5 inches, but other dimensions may also be used. The flange member 18 includes an inner perimeter 27 and a flange plate 29. The flange plate 29 is substantially perpendicular to axis of the inner perimeter 27. An opposing end of the second vacuum tube 16 is inserted into the flange member 18 and preferably attached to the flange member 18 with welding. The non-conductive tip tube 10 and the non-conductive connector tube 12 are preferably produced from a polyurethane plastic, but other suitable non-conductive materials may also be used. The first and second vacuum tubes 14, 16 are preferably fabricated from an abrasion resistant and impact resistant aluminum alloy such as 6063-T6.

Figure 3:
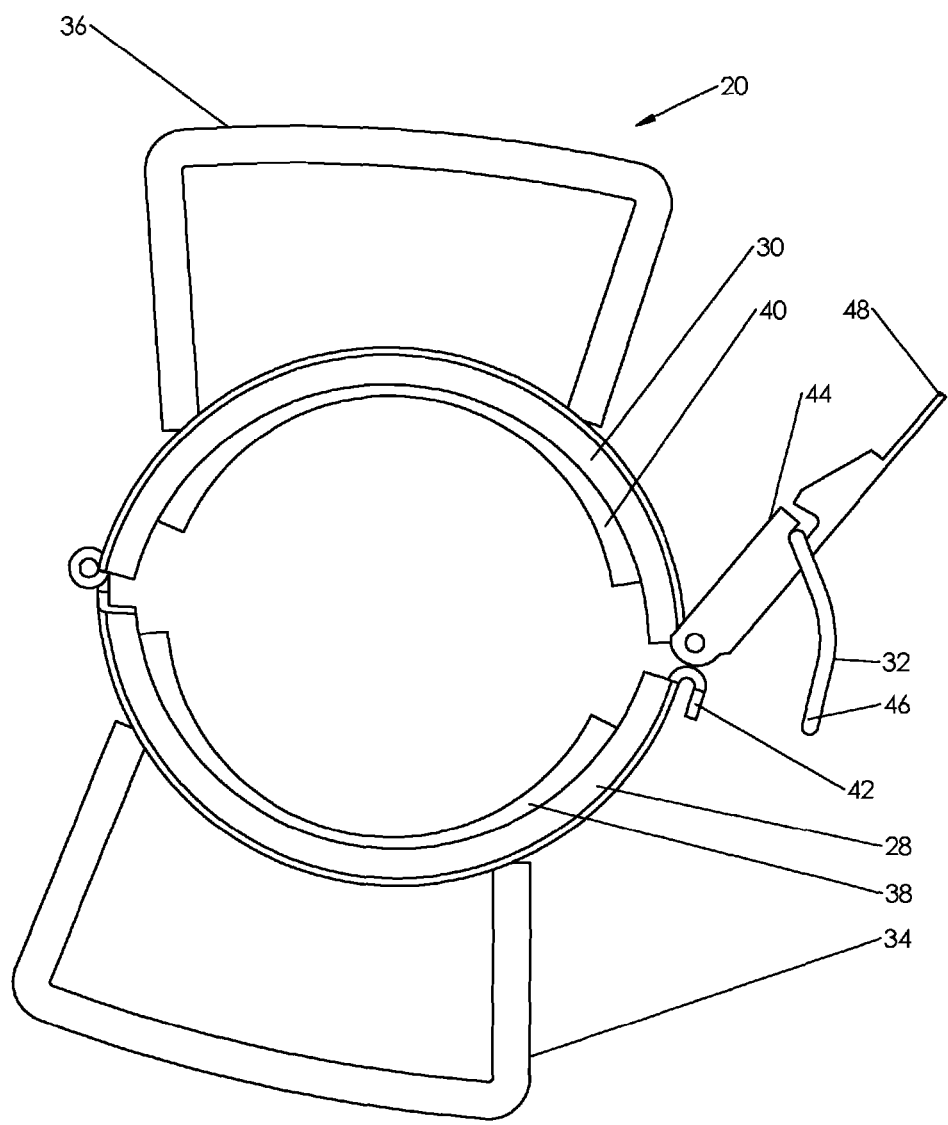
FIG. 3 is a top view of a handle of an insulated excavation tube in accordance with the present invention.

The handle 20 is preferably removably attached along a length of the second vacuum tube 16. With reference to FIG. 3, the handle 20 preferably includes a first frame member 28, a second frame member 30, a locking latch 32, a first handle loop 34 and a second handle loop 36. The first frame member 28 includes a first resilient gasket 38 attached to an inside perimeter thereof. The second frame member 30 includes a second resilient gasket 40 attached to an inside perimeter thereof. The first and second resilient and non-conductive gaskets 38, 40 provide electrical isolation and vibration isolation from the second vacuum tube 16. The first and second resilient gaskets 38, 40 are preferably produced from rubber. The first and second frame members 28, 30 preferably have an inward facing U-shaped cross sections to retain the first and second resilient gaskets 38, 40. The first and second frame members include a semi-circular shape to receive an outer perimeter of the second vacuum tube 16. One end of the first frame member 28 is pivotally secured to one end of the second frame member 30. A latch hook 42 is formed on an opposing end of the first frame member 28. The locking latch 32 includes a latch body 44, a latch loop 46 and a latch tab 48. One end of the latch body 44 is pivotally secured to an opposing end of the second frame member 30. The latch loop 46 is pivotally retained on the latch body 44. The latch tab 48 extends from an opposing end of the latch body 44.

The first handle loop 34 is attached to the first frame member 28 and the second handle loop 36 is attached to the second frame member 30. The first and second handle loops 34, 36 may be coated with a non-conductive material for extra electrical isolation and vibration isolation. However, the first and second handle loops 34, 36 could also be directly attached to the second vacuum tube 16. The handle 20 is attached to the second vacuum tube 16 by spreading the opposing ends of the first and second frame members 28, 30 and placing the first and second resilient gaskets 38, 40 in contact with the second vacuum tube 16. The latch loop 46 is engaged with the latch hook 42 and the latch tab 48 is pushed against the second frame member 30 to secure the handle 20 to the second vacuum tube 16.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An insulated excavation tube comprising:
a non-conductive tip tube having an inner perimeter, said non-conductive tip tube is produced from a polyurethane plastic material;
a vacuum tube having one end retained in one end of said inner perimeter, a distance is maintained between an opposing end of said non-conductive tip tube and said one end of said vacuum tube;
a flange member is attached to an opposing end of said vacuum tube; and
at least one handle loop is secured to an outer perimeter of said vacuum tube.

2. The insulated excavation tube of claim 1 wherein:
a handle includes a first frame member, a second frame member, a locking latch and said at least one handle loop, one end of said first frame member is attached to one end of said second frame member, one end of said locking latch is pivotally retained on an opposing end of said first frame member, an opposing end of said locking latch is removably engaged with an opposing end of said second frame member, said at least one handle loop is secured to at least one of said first and second frame members, wherein an opposing end of said first and second frame members are removably secured around said vacuum tube.

3. The insulated excavation tube of claim 2 wherein:
a resilient and non-conductive gasket is retained on an inside surface of said first and second frame members.

4. The insulated excavation tube of claim 1 wherein:
said flange member includes an inner perimeter and a flange plate, said inner perimeter is sized to receive said vacuum tube, said flange plate is substantially perpendicular to an axis of said inner perimeter.

5. The insulated excavation tube of claim 1 wherein:
said vacuum tube is fabricated from an aluminum alloy which is abrasion resistant and impact resistant.

6. The insulated excavation tube of claim 1 wherein:
said vacuum tube is secured to said non-conductive tip tube with a plurality of fasteners.

7. An insulated excavation tube comprising:
a non-conductive connector tube having an inner perimeter, said non-conductive connector tube is produced from a polyurethane plastic material;
a first vacuum tube is retained in one end of said inner perimeter;
a second vacuum tube having one end retained in an opposing end of said inner perimeter, a distance is maintained between said first and second vacuum tubes;
a flange member is attached to an opposing end of said second vacuum tube; and
at least one handle loop is secured to an outer perimeter of said second vacuum tube.

8. The insulated excavation tube of claim 7 wherein:
a handle includes a first frame member, a second frame member, a locking latch and said at least one handle loop, one end of said first frame member is attached to one end of said second frame member, one end of said locking latch is pivotally retained on an opposing end of said first frame member, an opposing end of said locking latch is removably engaged with an opposing end of said second frame member, said at least one handle loop is secured to at least one of said first and second frame members, wherein an opposing end of said first and second frame members are removably secured around said vacuum tube.

9. The insulated excavation tube of claim 8 wherein:
a resilient and non-conductive gasket is retained on an inside surface of said first and second frame members.

10. The insulated excavation tube of claim 7 wherein:
said flange member includes an inner perimeter and a flange plate, said inner perimeter is sized to receive said second vacuum tube, said flange plate is substantially perpendicular to an axis of said inner perimeter.

11. The insulated excavation tube of claim 7 wherein:
said first and second vacuum tubes are fabricated from an aluminum alloy which is abrasion resistant and impact resistant.

12. The insulated excavation tube of claim 7 wherein:
said first and second vacuum tubes are secured to said non-conductive connector tube with a plurality of fasteners.

13. An insulated excavation tube comprising:
a non-conductive tip tube having an inner perimeter;
a vacuum tube having one end retained in one end of said inner perimeter, a distance is maintained between an opposing end of said non-conductive tip tube and said one end of said vacuum tube;
a flange member is attached to an opposing end of said vacuum tube, said flange member includes an inner perimeter and a flange plate, said inner perimeter is sized to receive said vacuum tube, said flange plate is substantially perpendicular to an axis of said inner perimeter; and at least one handle loop is secured to an outer perimeter of said vacuum tube.

14. The insulated excavation tube of claim 13 wherein:

a handle includes a first frame member, a second frame member, a locking latch and said at least one handle loop, one end of said first frame member is attached to one end of said second frame member, one end of said locking latch is pivotally retained on an opposing end of said first frame member, an opposing end of said locking latch is removably engaged with an opposing end of said second frame member, said at least one handle loop is secured to at least one of said first and second frame members, wherein an opposing end of said first and second frame members are removably secured around said vacuum tube.

15. The insulated excavation tube of claim 14 wherein:

a resilient and non-conductive gasket is retained on an inside surface of said first and second frame members.

16. The insulated excavation tube of claim 13 wherein:

said vacuum tube is fabricated from an aluminum alloy which is abrasion resistant and impact resistant.

17. The insulated excavation tube of claim 13 wherein:

said vacuum tube is secured to said non-conductive tip tube with a plurality of fasteners.

\* \* \* \* \*